(12) United States Patent
Pinnavaia et al.

(10) Patent No.: US 6,641,657 B2
(45) Date of Patent: Nov. 4, 2003

(54) SILICA FOAM COMPOSITIONS

(75) Inventors: Thomas J. Pinnavaia, East Lansing, MI (US); Thomas R. Pauly, Lansing, MI (US); Seong-Su Kim, Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 0 days.

(21) Appl. No.: 10/132,766

(22) Filed: Apr. 25, 2002

(65) Prior Publication Data

US 2002/0160176 A1 Oct. 31, 2002

Related U.S. Application Data

(62) Division of application No. 09/631,797, filed on Aug. 3, 2000, now Pat. No. 6,506,485.
(60) Provisional application No. 60/197,033, filed on Apr. 13, 2000.

(51) Int. Cl.$^7$ ................................................ C04B 38/00
(52) U.S. Cl. ...................... 106/601; 106/603; 106/122; 428/312.6; 428/312.2; 423/335; 423/339
(58) Field of Search ........................... 428/312.6, 213.2; 423/335, 339; 106/122, 601, 603

(56) References Cited

U.S. PATENT DOCUMENTS

6,506,485 B1 * 1/2003 Pinnavaia et al. ....... 428/312.6

FOREIGN PATENT DOCUMENTS

DE           286522          10/1983

OTHER PUBLICATIONS

Schmidt–Winkel et al in J. Am. Chem. Soc. 121 254–255 (1999).
Chem. Materials 12 686–696 (1999).
Kim et al Science 282 1302 (1998).
Sing et al., Pure Appl. Chem., 57, 603–619 (1985).

* cited by examiner

*Primary Examiner*—Cheryl A. Juska
*Assistant Examiner*—Hai Vo
(74) *Attorney, Agent, or Firm*—Ian C. McLeod

(57) ABSTRACT

Porous inorganic silica foam compositions are derived from water soluble silicate precursors and swollen non-ionic polymer templates are described. The compositions are useful as catalyst supports and as catalysts in hydrocarbon cracking and organic reactions, among other applications.

7 Claims, 7 Drawing Sheets

SILICA FOAM COMPOSITIONS

CROSS-REFERENCE TO RELATED APPLICATIONS

This is a divisional application of Ser. No. 09/631,797, filed Aug. 3, 2000, now U.S. Pat. No. 6,506,485. The present application relies for priority on application Ser. No. 60/197,033, filed Apr. 13, 2000.

BACKGROUND OF THE INVENTION (1) Field of the Invention

The present invention relates to novel heat stable, mesoporous to small macroporous, inorganic silica foam compositions. In particular, the present invention relates to porous silica foam compositions which are highly cross-linked having a ratio of $Q^4/(Q^3+Q^2)$ of between 2.5 and 8.

(2) Description of Related Art

Mesoporous cellular foams (MCF) with large pore sizes (20 to 45 nm) are relatively new in the art, being templated by microemulsion of "oil in water". Foams of this type are described by Schmidt-Winkel et al in J. Am. Chem. Soc. 121 254–255 (1999) and Chem. Materials 12 686–696 (1999). According to the teachings provided by Schmidt-Winkel et al, MCF materials exhibit x-ray diffraction peaks at small scattering angles. However, the peaks cannot be indexed to any plane or space group indicative of a regular ordered structure. Instead, the x-ray peaks are consistent with the presence of cells of more or less spherical shape and size. They further teach that direct evidence for a cellular foam structure is obtained from transmission electron microscopy (TEM) images which show a reticulated assembly of cells connected by open windows with an average diameter smaller than the average diameter of the cells. The silica walls of the cells are described as being "strut-like".

The prior art foams are prepared from microemulsion solution of BASF PLURONIC 123™, a poly(ethylene oxide) block-(polypropylene oxide) block-(poly(ethylene oxide) block triblock co-polymer ($EO_{20}PO_{70}EO_{20}$), Molecular Weight Average=5800 (Aldrich, Milwaukee, Wis.), and an organic co-solvent (1,3,5-trimethylbenzene) in the presence of a strong acid (HCl) admixed with tetraethoxysilane as the silica forming agent. The resulting very acidic conditions limited the silica framework crosslinking to a maximum $Q^4/(Q^2+Q^3)$ value of 2.5 wherein $Q^n$ is the fraction of tetrahedral $SiO_4$ centers linked to n adjacent silicon atoms through bridging oxygens. In most silica compositions, the magnitude of $Q^2$ is small in relationship to the values of $Q^3$ and $Q^4$, and not readily observable by $^{29}Si$ MAS NMR, so that the crosslinking parameter is approximately equal to the ratio $Q^4/Q^3$. The $Q^4$ and $Q^3$ environments are readily distinguished by resolvable $^{29}Si$ MAS NMR lines, the relative intensities of which provide the magnitudes of $Q^n$. The optimal crosslinking value of 2.5 was obtained under conditions that require the presence of fluoride ion to facilitate framework crosslinking and optimize the pore size. In the absence of fluoride ion the value of the crosslinking parameter was 2.22. The relatively low framework crosslinking parameter, $Q^4/Q^3+Q^2$, limits the framework stability under hydrothermal conditions. Also, the use of highly acidic reaction conditions and fluoride ion are undesirable because of the corrosive nature of these reagents.

OBJECTS

There is a need for porous silica foam compositions with improved framework crosslinking and stability properties.

There is also a need for foams which are economical to prepare under less corrosive conditions. Also, it is desirable for applications of MCF materials in thermal insulation to increase the pore size distribution to include the small macropore cell size region from 50–100 nm. These and other objects will become increasingly apparent by reference to the following description and the drawings.

SUMMARY OF THE INVENTION

The present invention relates to a mesoporous to small macroporous cellular silica foam composition with interconnected cells joined at nexus defining cellular pores with open windows between the cellular pores and with the $SiO_4$ tetrahedra crosslinked to four adjacent silicon sites ($Q^4$), to three adjacent silicon sites ($Q^3$), and to two adjacent silicon sites ($Q^2$), the ratio of $Q^4/(Q^3+Q^2)$ being between 2.5 and about 8.

The present invention also relates to a hybrid mesoporous to small macroporous cellular silica foam composition with interconnected cells joined at nexus defining cellular pores with open windows between the cellular pores and with $SiO_4$ tetrahedra of the cell walls crosslinked to four adjacent silicon sites ($Q^4$), to three adjacent silicon sites ($Q^3$), and to two adjacent silicon sites ($Q^2$), the ratio of $Q^4/(Q^3+Q^2)$ being between 2.5 and about 8, containing a surfactant and an organic co-solvent which swells the surfactant in the cellular pores.

Further, the present invention relates to a process for the preparation of a mesoporous to small macroporous cellular silica foam composition with interconnected cells joined at nexus which comprises:

(a) providing an aqueous mixture of a surfactant and an organic co-solvent which swells the surfactant as emulsifying agents;

(b) providing a solution of a water soluble silicate;

(c) providing an acid in an amount sufficient to cause precipitation of silica from the silicate solution at a pH between about 5.0 and 9.0.

(d) combining the reagents in parts (a), (b) and (c) at a temperature greater than −20° C.;

(e) allowing the reaction mixture of step (d) to age for a minimum time of 5 minutes at one or more temperatures above −20° C.; and (f) recovering the precipitated product from the solution.

Preferably the soluble silica solution is a sodium silicate with $SiO_2/OH^-$ ratio of between 0.7 and 2.0.

The process also optionally includes removing the surfactant and the co-solvent by solvent extraction or calcination or by a combination of solvent extraction and calcination of the precipitated product in air at a temperature greater than 300° C. for not less than 30 minutes. At least 85% of the surfactant and organic co-solvent can be removed from the cells by extraction with boiling ethanol, as well as other hot organic solvents, but it is generally more convenient to remove the surfactant and organic co-solvent by calcination.

The silica foam composition has pores in the mesopore range (2–50 nm) and into the small macropore range (50–100 nm), preferably has pores between 10 and 100 nm in diameter and windows between the cells with a diameter between about 5 and 70 nm. The volume per unit weight is between about 1 and 4 cc per gram. Most importantly, the compositions have cell walls wherein the $SiO_4$ crosslinking parameter $$\frac{Q^4}{Q^2+Q^3}$$

has a value of at least 2.5 in the absence of fluoride and most preferably, values greater than this minimum value, in order to improve the thermal and hydrothermal stability of the cell walls. Kim et al (Science 282 1302 (1998)) have demonstrated that the thermal and hydrothermal stability of a porous silica structure is substantially improved by increasing the crosslinking of the $SiO_4$ tetrahedra that comprise the pore walls. A framework crosslinking parameter, $Q^4/Q^3+Q^2$, with a value of at least 2.5 and up to about 8 is possible by digestion of as-made mesostructures at temperatures of 100° C. and above. The exact value of the crosslinking parameter is determined by the digestion temperature and time. In general, the value of the crosslinking parameter increases with increasing digestion temperature. The importance of a high $SiO_4$ crosslinking value cannot be overstated, because the utility of porous silica compositions is highly dependent on structural stability under thermal and hydrothermal conditions. The novelty of the present invention lies in part on providing silica foam compositions with $SiO_4$ crosslinking parameter values substantially greater than the limiting maximum value of 2.5 of previously reported foam compositions. Also, the expanded cellular pore size distribution, which includes small macropores in the range 50–100 nm, is another novel feature of this invention.

By incorporating other inorganic elements along with silicon into the assembly of the porous cellular foams, inorganic functionality can be introduced into the foam compositions. Many metallic elements (e.g. P, Ba, Y, La, Ce, Sn, Ga, Zn, Co, Ni, Co, Mo, and Cu) can be incorporated into the silica walls of the foams by linking to oxygen atoms in the walls. Aluminum, titanium, vanadium and the other said elements, are easily incorporated into silica frameworks simply by including reagents of these elements into the foam assembly reaction.

In addition, organic or organometallic functionality can be introduced into the foam compositions of this invention by reacting the said compositions with silane coupling agents selected from the group $X_3SiR$, $X_2SiR_2$, $XSiR_3$ and mixtures thereof where X is a hydrolyzable group (e.g. alkoxide or halide) and R is an organo group of the desired functionality.

DESCRIPTION OF PREFERRED EMBODIMENTS

Figure 1:
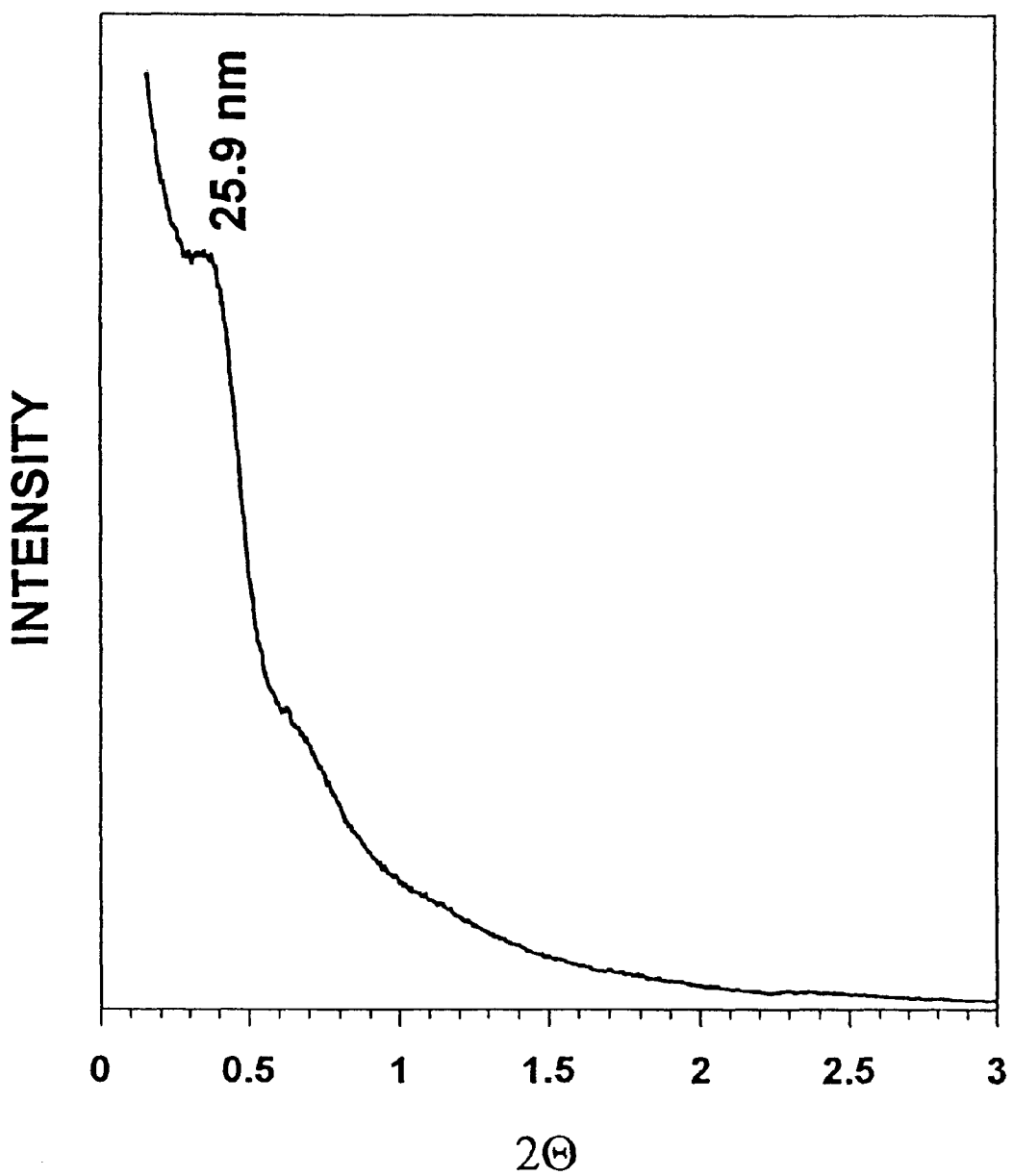
FIG. 1 is a graph showing the small angle X-ray scattering (SAXS) pattern of the calcined foam composition of Example 1.

The phrase "co-solvents" as used herein means a water insoluble organic compound, which in combination with the surfactant form emulsions in an aqueous solution which direct the assembly of a mesoporous to small macroporous cellular silica foam. The co-solvent is an organic compound which swells the surfactant and which is not a polymer. Such compounds are trialkylbenzenes (where "alkyl" is 1 to 6 carbon atoms) such as 1,3,5-tri-methylbenzene, alcohols containing 6 to 22 carbon atoms such as 1-dodecanol, and alkanes containing 6 to 22 carbon atoms.

The term "surfactant" in general means a composition which is a surface active agent, such as those found in detergents and emulsions. In particular, in the context of the present invention, the term "surfactant" means poly (alkylene oxide) based polymers.

There are four basic types of poly(alkylene oxide) surfactant molecules that are specifically preferred. The alkyl-polyethylene oxides; such as those related to the TERGITOL 15-S-m products which are derived from the reaction of ethylene oxide with a primary or secondary alcohol and possess the basic formula $R_n$—$O(EO)_m H$ where R is a hydrophobic alkyl group with n ranging up to about 22 carbon atoms. EO is a hydrophilic ethylene oxide unit ($OCH_2CH_2$) with m ranging from about 7 to 40. The BRIJ series of surfactants (ICI) are alkyl polyethylene oxides analogous to TERGITOL surfactants.

The alkyl-phenyl polyethylene oxides such as IGEPAL-RC and TRITON-X possess the same range of structures as the alkyl-polyethylene oxides, with the exception that the primary (IGEPAL RC), secondary or tertiary (TRITON X) R group is bound to the EO units through a hydrophobic phenoxy group (PhO). These molecules then have the basic formula; $R_n$—Ph—$O(EO)_m H$, preferably where m is 8 to 10 and n is 8.

The polyethylene oxide (PEO) polypropylene oxide (PPO) block co-polymers; such as PLURONIC are derived from the addition of hydrophobic propylene oxide to propylene glycol followed by the addition of hydrophilic ethylene oxide. They are defined as $PEO_n$—$PPO_m$—$PEO_n$ tri-block co-polymers wherein n is controlled by length to constitute from 10% to 80% by weight of the final product. The order of the PEO and PPO units may be reversed in order to produce the $PPO_m$-$PEO_n$-$PPO_m$ triblock co-polymers, such as PLURONIC-R surfactants.

A fourth basic PEO based surfactant type is derived by (from) the substitution of the hydrogens of ethylene diamine by ethylene oxide and propylene oxide units to form the X shaped, TETRONIC, molecules with basic formula; $((EO)_n$—$(PO)_m)_2 NCH_2 CH_2 N$—$((PO)_m$—$(EO)_n)_2$. The order of the PEO and PPO groups in these molecules may also be reversed to form TETRONIC-R.

A subset of the polyethylene oxide polymers are those which are sorbitan ester ethoxylates. These are represented by the TWEENS™.

PEO based surfactants generally have the advantages of low cost, non-toxicity, and biodegradability.

In the context of the present invention, the term "water soluble silicate" means a sodium, potassium, or alkylammonium silicate capable of being dissolved in water or a basic solution of a said salt containing a sodium or potassium hydroxide or an alkylammonium hydroxide. Preferably, the said solutions have a $SiO_2/OH^-$ molar ratio of between about 0.5 and 4.0. Most, if not all, of the hydroxide ion equivalents contained in the soluble silicate solutions are neutralized by admixing with an amount of acid so that the final pH of the foam assembly reaction is in the range 5.0 to 9.0, and more preferably, near a neutral pH of 7.0.

The acid used to react with the hydroxide component of the water soluble silicate solution can be an inorganic acid or an organic acid, or mixture thereof. Inorganic acids are $HNO_3$, HCl, $H_2SO_4$ and the like. Organic acids are acetic, glycolic, formic and citric acids.

The molar ratio of the inorganic silica reagent to nonionic surfactant is preferably between 1:1 and 50:1, more preferably 5:1 and 20:1, depending upon the specific surfactant being used. The concentration of surfactant and co-solvent is typically between 0.003 mol $L^{-1}$ and 0.4 mol $L^{-1}$, again depending upon the surfactant and co-solvent being used and the pore size desired.

The hydroxylated silica composition of the present invention preferably has the formula:

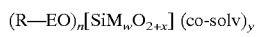

$$(R\text{—}EO)_n[SiM_wO_{2+x}] \text{(co-solv)}_y$$

wherein $[SiM_wO_{2+x}]$ is written in anhydrous form without hydroxyl groups or water, wherein R—EO is at least one surfactant selected from the group of nonionic alkyl polyethylene oxide polymer, alkyl-aryl polyethylene oxide polymer, polyethylene oxide-polypropylene oxide block co-polymer and sorbitan polyethylene oxide molecules; wherein (co-solv) is at least one organic co-solvent; wherein when R—EO is present, n is between about 0.04 and 2; wherein when M is present is at least one element selected from the group comprising P, Ba, Y, La, Ce, Sn, Ga, Al, Zn, Co, Rh, Nb, Re, Ag, Zr, V, Cr, Pt, Pd, Ti, Ni, Mo and Cu and w, 2+x, and y are the molar stoichiometries of M, "O" and co-solvent, respectively, wherein w is 0.00 to 0.30; x is 0.00 to 0.90; and y is >0, and wherein in the composition when calcined n is about 0.0; w is 0.00 to 0.30; x is 0.0 to 0.90; and y is about 0.0.

The compositions described in anhydrous form as $(R\text{—}EO)_nSiM_wO_{2+x}(\text{co-solv})_y$, with n=0, with w between 0.0 and 0.30, with x between 0.0 and 0.90, and with y=0 may be used as adsorbents, molecular sieves, catalysts and catalyst supports. When the surfactant and co-solvent-free foam framework appropriately contains M, one or more functional metallic nonmetallic or metalloid elements, or subsequently impregnated as taught in Ger. Pat. (DD) No. 286,522, with the correct amount of a catalytically active element, selected from the group comprising Sn, P, Ba, Y, La, Ce, Ga, Al, Rh, Nb, Re, Ag, Cr, Pt, Pd, Ti, V, Zr, Zn, Co, Mo, Ni, Cu or mixtures thereof, or when intercalated with transition metal inorganic metallocycles, it can be used as a catalyst component for cracking, hydrocracking, hydrogenation-dehydrogenation, isomerization or oxidations involving large and small organic substrates. Preferably, the molar ratio of the impregnated functional element to silica is between 0.005 and 0.15 to 1.

The new synthesis process of the compositions of this invention involves the preparation of structure-directing microemulsions formed from a surfactant and co-solvent compound and reaction of this solution with the inorganic silica precursor under stirring, sonication, shaking, or quiescent conditions until formation of the desired precipitated product is achieved at a pH between 5 and 9, more preferably very near a neutral pH of 7, and recovering the mesoporous silica product. The surfactant is described more particularly as a nonionic (electrically neutral) polyethylene oxide based molecule that would possess one of many different molecular structures and the hydrolysing agent is described as water.

The assembled mesostructured silicas of the present invention can be combined with other components, for example, zeolites, clays, inorganic oxides, carbon, graphite, or organic polymers or mixtures thereof. In this way adsorbents, ion-exchangers, catalysts, catalyst supports or composite materials with a wide variety of properties can be prepared. Additionally, one skilled in the art can impregnate or encapsulate transition metal macrocyclic molecules such as porphyrins or phthalocyanines containing a wide variety of catalytically active metal centers.

Additionally, the surfaces of the compositions can be chemically functionalized in order to produce catalytic, hydrophilic or hydrophobic surfaces. The surfaces may be functionalized after synthesis by reaction with various metal salts, organometallic reagents, silylation reagents, or alkylating reagents.

The silica composition is preferably functionalized by reaction of the surface silanol groups of the composition with an organosilane selected from the group consisting of $X_3SiR$, $X_2SiR_2$, $XSiR_3$ and mixture thereof where X is a hydrolyzable moiety and R is an organo group containing organic or organometallic functionality.

Another important use of the mesoporous cellular foam silicas is as thermal insulation materials. The foam structure minimizes heat transfer by entrapping air and preventing convection. Also, conduction of heat is minimized by the cellular structure. Because silica is a ceramic oxide, insulating properties can be maintained at very high temperatures.

In the examples below x-ray diffraction patterns were obtained with a RIGAKU ROTAFLEX™ diffractometer (Rigaku USA, Danbers, Mass.) a rotating anode and Cu—K$\alpha$ radiation ($\lambda$=0.15418 nm). The TEM image was obtained with a JEOL 100 CX™ (JEOL, USA, Peabody, Mass.) microscope using an accelerating voltage of 120 kV and a 20 $\mu$m objective lens aperture, $N_2$ isotherms were obtained using a Micromeritic ASAP-2010™ (Norcross, Ga.) sorptometer operated under continuous adsorption conditions. $^{27}$Al MAS NMR spectra were obtained using a VARIAN VXR-400™ (Palo Alto, Calif.) NMR spectrometer equipped with a VARIAN MAS probe and SiN rotor. The spectrometer frequency was 104.22 MHz pulse width 2 ms, and sample spinning rate 6550 Hz.

Most previously reported studies of mesoporous molecular sieves have made use of the Horvath-Kawazoe (HK) model (Horvath, G., et al., J. Chem. Eng. Jpn. 16, 470 (1983)) for the determination of pore size distributions from $N_2$ adsorption isotherms. This model, developed for microporous lamellar carbons, assumes slit-like micropores. In this invention, the Barrett-Joyner-Halender (BJH) (Barrett, E. P., et al., J. Amer. Chem. Soc. 73, 373 (1951)) model was applied to the adsorption and desorption legs of the nitrogen isotherms to determine the size distribution of the cellular foams and the window diameters connecting the cells, respectively.

Cellular foam silicas (denoted MSU-F) and alumina substituted derivatives were prepared. These materials are structures similar to mesoporous MCF of the prior art materials but differ fundamentally in the degree of $SiO_4$ tetrahedral crosslinking and properties. The ratio of $Q^4$ to $(Q^3+Q^2)$ sites is much larger for MSU-F than for MCF materials. In addition, the MSU-F compositions of the present invention go beyond the prior art of mesoporous MCF materials by extending the cell pore size distribution into the small macroporous range from 50 to about 100 nm. The cell pore size and pore volume, can be controlled by adjusting the droplet size of the templating emulsion. Liquid pore volumes of at least 1.0 cc/g and extending to about 3.0 cc/g are possible by selecting a suitable combination of surfactant and organic co-solvent in forming the templating microemulsion droplets. Also, MSU-F materials are prepared from low cost sodium silicate, under near-neutral pH conditions, in presence of a surfactant and a swelling co-solvent. The silicas are heat stable to calcining.

Alumina-substituted mesoporous silicas are preferably made by (a) direct assembly, or (b) post-synthesis treatment of a MSU-F silica with an aluminum reagent. Aluminum-substituted derivative of MSU-F foam structures are especially valuable because they are intrinsically acidic and useful as catalysts for Friedel-Krafts alkylations of aromatics and the cracking or hydrocracking of petroleum and other oils to more useful fuels and feed stocks. Organofunctionalized derivatives of MSU-F can be prepared by post-synthesis treatment of MSU-F silica with organosilane reagents using standard surface grafting reactions well known to practitioners of the art.

EXAMPLE 1

A surfactant solution was prepared by adding 1.2 gram of PLURONIC P123™ ($EO_{20}PO_{70}EO_{20}$) to 10 milliliters of water. 10 milliliters of 1.0 M acetic acid was added to the surfactant solution and stirred for 2 hours. One(1) gram of 1,3,5-trimethylbenzene (TMB) as the organic co-solvent agent was then added to the surfactant solution at room temperature. This provided the emulsion for templating the mesoporous cellular foam. Following 2 hours of stirring, 2.7 grams of sodium silicate (27% $SiO_2$, ~14% NaOH) in 30 milliliters of water was added. The reaction vessel was sealed and stirred at 60° C. for 20 hours. The final pH was 6.4. The reaction stoichiometry expressed in terms of per mole $SiO_2$ corresponded to the following:

| Amount | Reagent |
|---|---|
| 0.0165 | P123 |
| 0.67 | TMB |
| 0.77 | NaOH |
| 0.80 | $CH_3O_2H$ |
| 230 | $H_2O$ |

The resulting solid product was recovered by filtration and calcined at 600° C. for 4 hours in air to remove the incorporated template and provide the silica foam composition.

Small-angle X-ray scattering (SAXS) patterns were obtained for all samples using the Rigaku Rotaflex™ Diffractometer with CuKα radiation. The pore structures of the compositions were characterized by measuring N2 adsorption-desorption isotherms using the Micromeritics ASAP 2010™ Sorptometer. N2 adsorption-desorption isotherms were obtained at −196° C. on using static adsorption procedures in order to characterize the pore structure. Samples were outgassed at 150° C. and $10^{-6}$ Torr for a minimum of 12 hours. The specific surface area (SBET, $m^2$ $g^{-1}$) and the total pore volumes ($V_t$, mL $g^{-1}$), which were consistent with mesoporous structures, were calculated from the $N_2$ adsorption isotherms following IUPAC recommendations (Sing et al., Pure Appl. Chem., 57, 603–619 (1985)). The pore size distributions of compositions were calculated following the method of BJH. TEM images were obtained on a JEOL JEM-100CX™ II electron microscope with a $CeB_6$ filament and accelerating voltage of 120 KV, a beam size of approx. 5 μm, and a diffraction aperture of 20 μm. $^{29}Si$ MAS NMR spectra were recorded on a Varian 400 VRX™ (Palo Alto, Calif.) solid-state NMR Spectrometer at 79.5 MHz under single-pulse mode with a 7-mm Zirconia rotor, a spinning frequency of 4 kHz, pulse width of 8.5 μs and a pulse delay of 800 seconds. The chemical shifts were referenced to TMS (tetramethylsilane).

Figure 2:
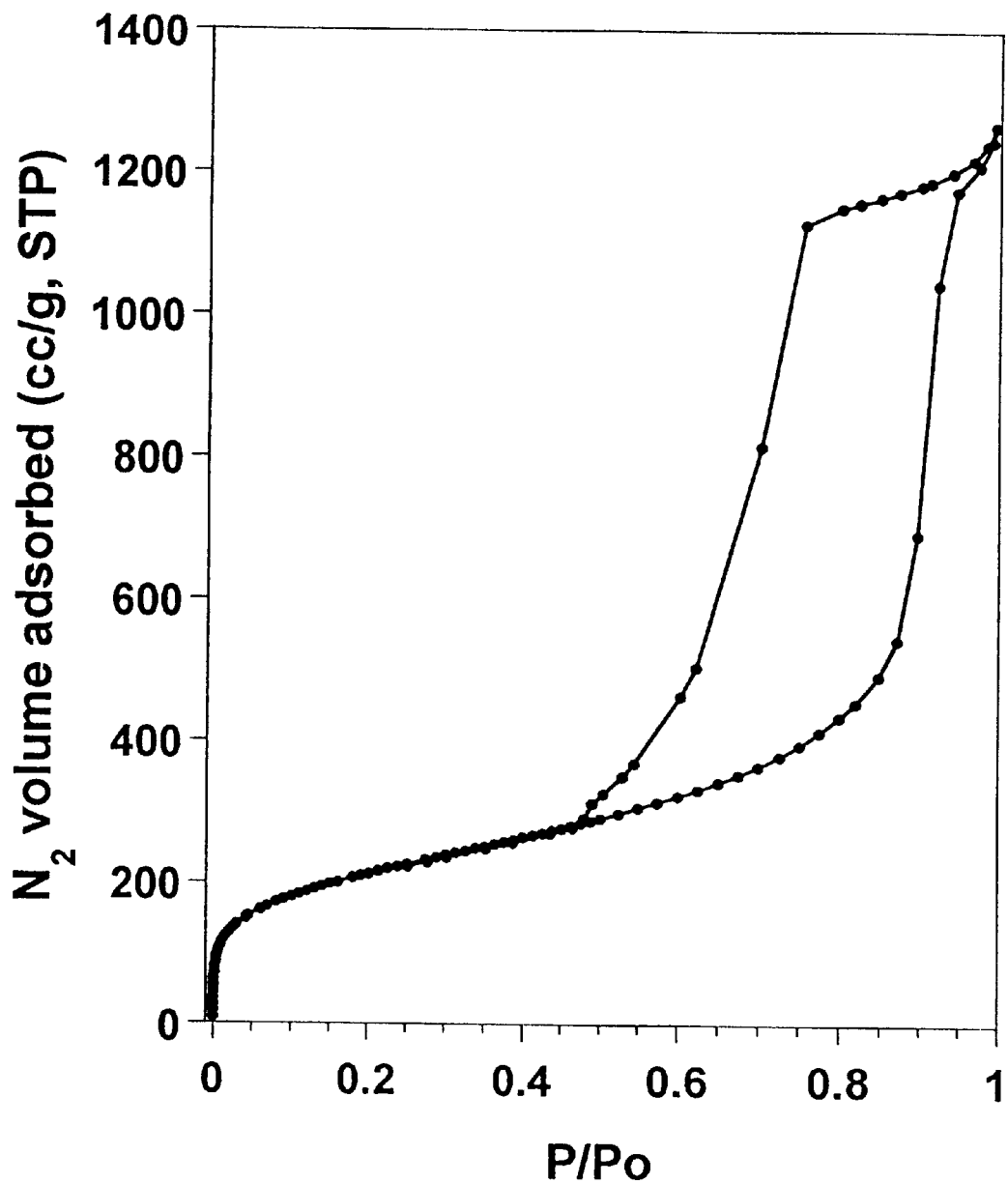
FIG. 2 is a graph showing the $N_2$ absorption-desorption isotherms of calcined foam composition of Example 1. The FIG. 2A provides the BJH cellular pore size distribution calculated from the adsorption branch of the $N_2$ isotherm.
Figure 2A:
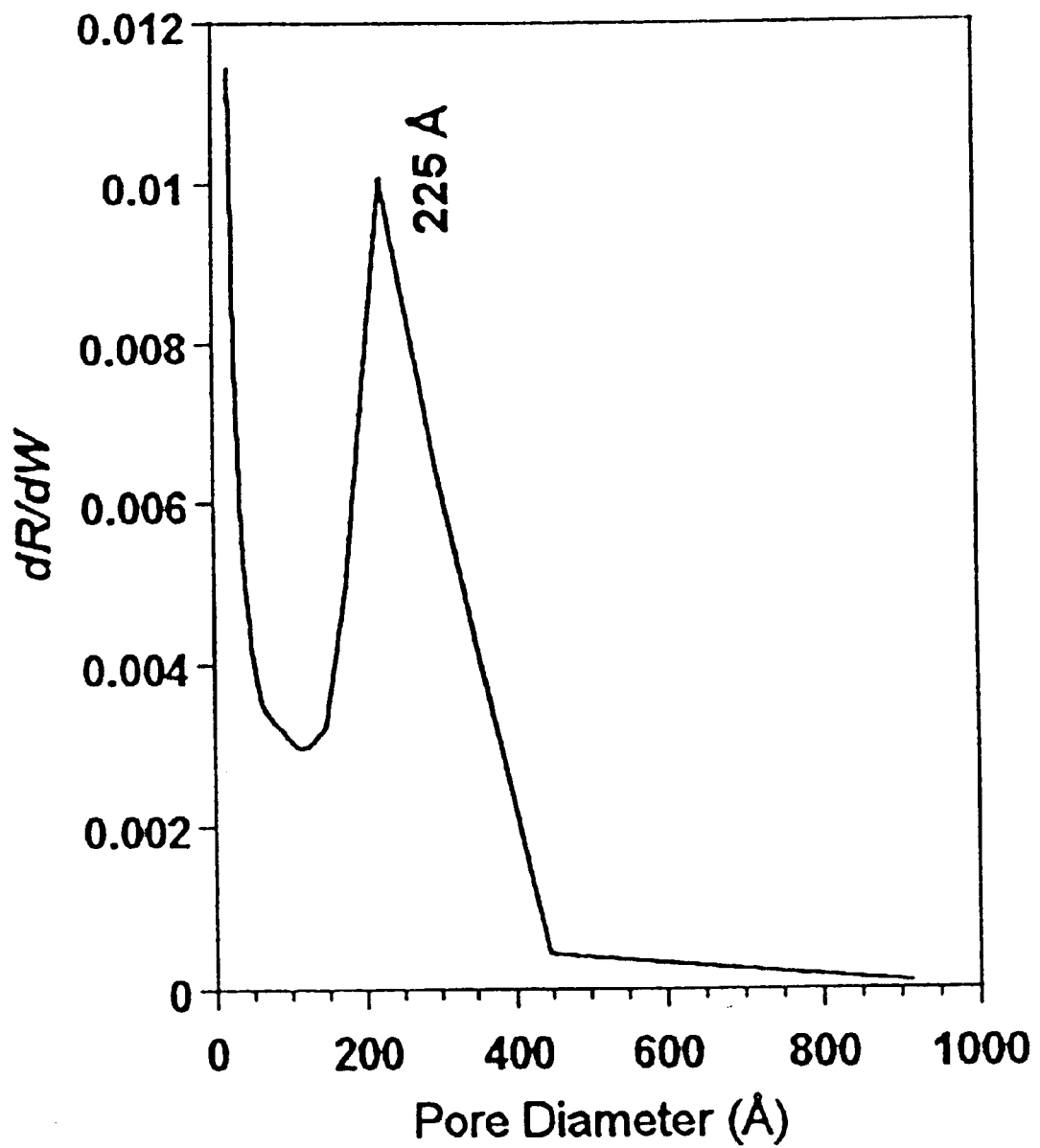
Figure 3:
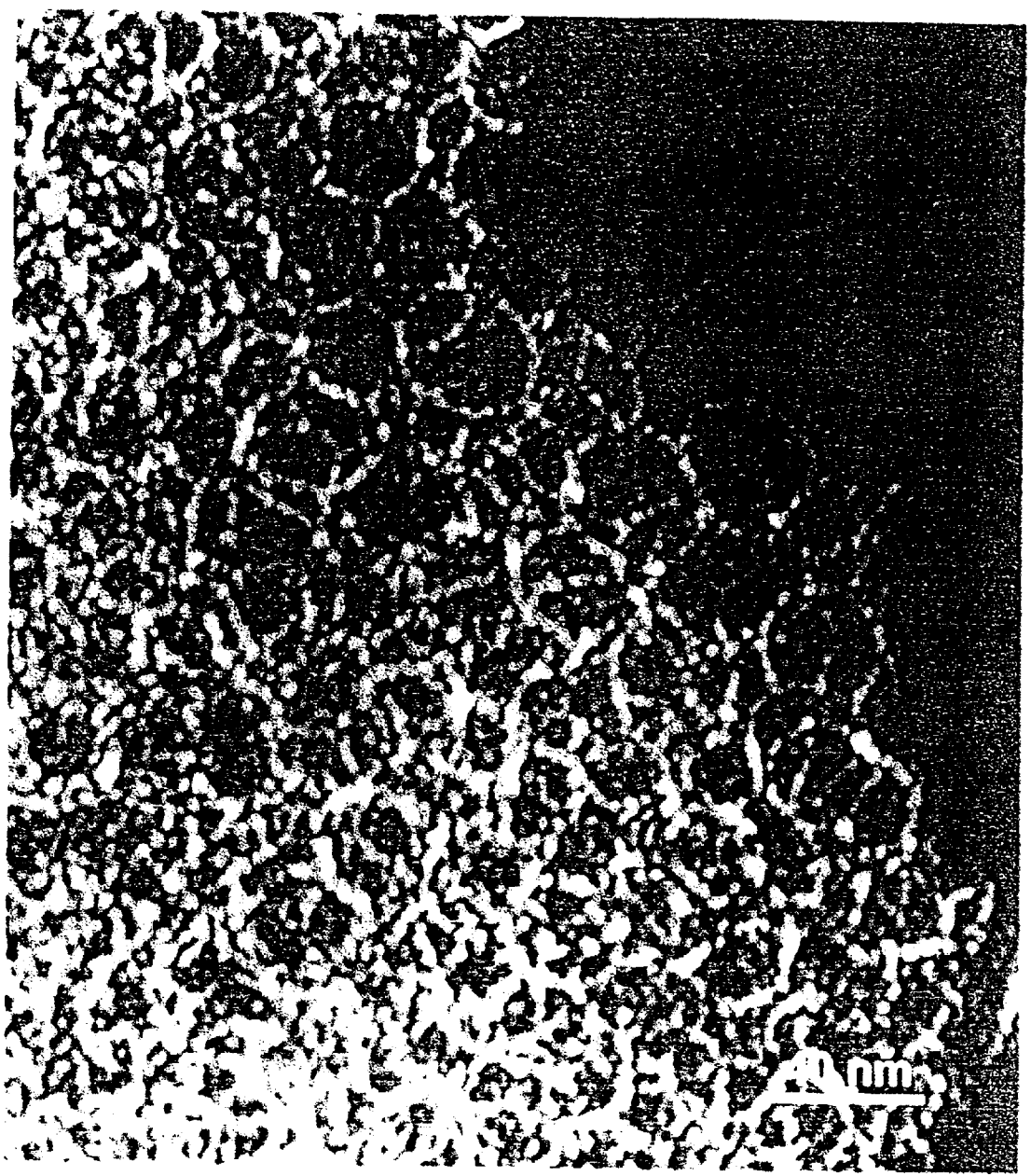
FIG. 3 is a TEM micrograph showing the calcined foam composition of Example 1.

The small angle X-ray scattering (SAXS) pattern of the calcined product (FIG. 1) exhibited an intense peak at 25.9 nm and a weak shoulder between 0.5~1.5 degrees (2θ), consistent with a foam structure. FIG. 2 shows the $N_2$ adsorption-desorption isotherm and BJH pore size distribution plot (FIG. 2A) from adsorption branch of the $N_2$ isotherms for the calcined product. This material has an average pore size of 22.5 nm, a BET surface area of 759 $m^2$ $g^{-1}$, and a mesopore volume of 1.87 $cm^3$ $g^{-1}$. TEM images of the calcined product (FIG. 3) verified a cellular foam structure (denoted MSU-F) composed of large, more or less spherical cells of silica joined at open windows.

EXAMPLES 2–6

The following Examples demonstrate control of the pore sizes of the cellular foams. The concentration of TMB as the organic co-solvent that acts as a swelling agent is varied while the amount of P123 is kept constant. Thus, the amount of TMB used is expressed in terms of TMB/P123 weight ratios.

A surfactant solution was prepared by adding 1.2 gram of PLURONIC P123 ($EO_{20}PO_{70}EO_{20}$) to 10 milliliters of water. 10 milliliters of 1.0 M acetic acid was added to the surfactant solution and stirred for 2 hours. This amount of acid is sufficient to neutralize the hydroxide ion concentration in the silicate solution. Between about 0.36 and 1.2 grams of 1,3,5-trimethylbenzene (TMB) as the organic swelling agent was then added at room temperature. Following 2 hours of stirring at 35° C., 2.7 grams of sodium silicate (27% $SiO_2$, ~14% NaOH) in 30 milliliters of water was added. After 20 hours at 35° C., the reaction mixture was aged at 100° C. for 1 day under static conditions. The final pH of the solution was about 6.5. The reaction stoichiometry expressed in terms of per mole $SiO_2$ corresponded to the following:

| Amount | Reagent |
|---|---|
| 0.0165 | P123 |
| 0.24 ~ 0.80 | TMB |
| 0.77 | NaOH |
| 0.80 | $CH_3O_2H$ |
| 230 | $H_2O$ |

The resulting solid product was recovered by filtration and calcined at 600° C. for 4 hours in air to remove the incorporated template to provide the foamed silica composition.

The physico-chemical properties of Examples 2–6 are presented in Table 1.

TABLE 1

| Example | TMB/P123' (w/w)[a] | Pore Size (nm)[b] | Window size (nm)[c] | Surface area ($m^2g^{-1}$)[d] | Pore Volume ($cm^3g^{-1}$) |
|---|---|---|---|---|---|
| 2 | 0.3 | 21.5 | 12.8 | 474 | 1.71 |
| 3 | 0.5 | 27.5 | 14.7 | 428 | 1.92 |
| 4 | 0.8 | 33.5 | 17.6 | 402 | 1.80 |
| 5 | 1.0 | 28.8 | 16.0 | 424 | 1.92 |
| 6 | 1.3 | 29.9 | 17.9 | 437 | 1.96 |

[a]Weight ratio using a fixed amount of P123.
[b]Determined from nitrogen adsorption.
[c]Determined from nitrogen desorption.
[d]BET method.

Figure 4:
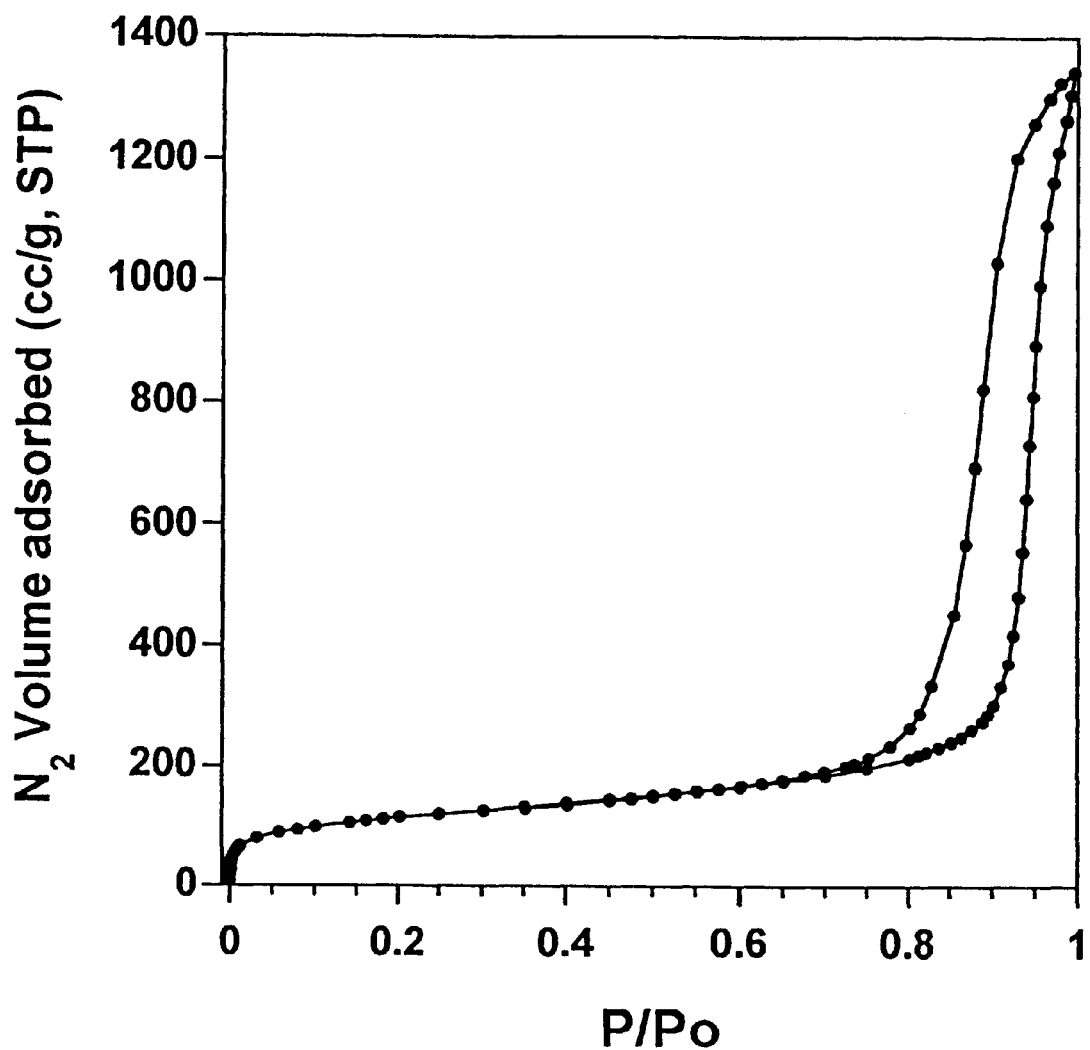
FIG. 4 is a graph showing the $N_2$ adsorption-desorption isotherms of the calcined foam composition of Example 4. The FIG. 4A is a graph showing the BJH cell pore size and window pore size distributions calculated from the $N_2$ adsorption and desorption isotherms of FIG. 4, respectively.
Figure 4A:
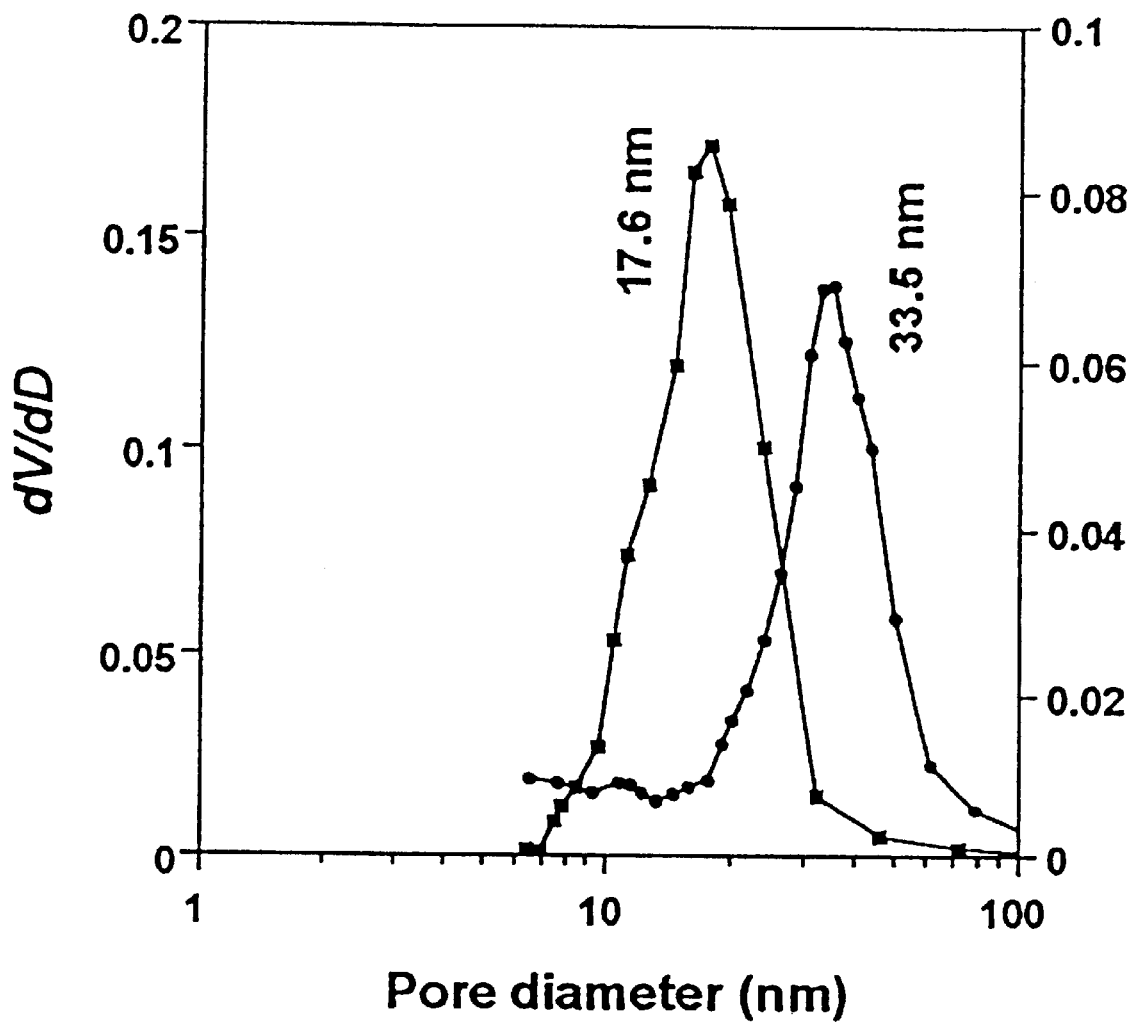
Figure 5:
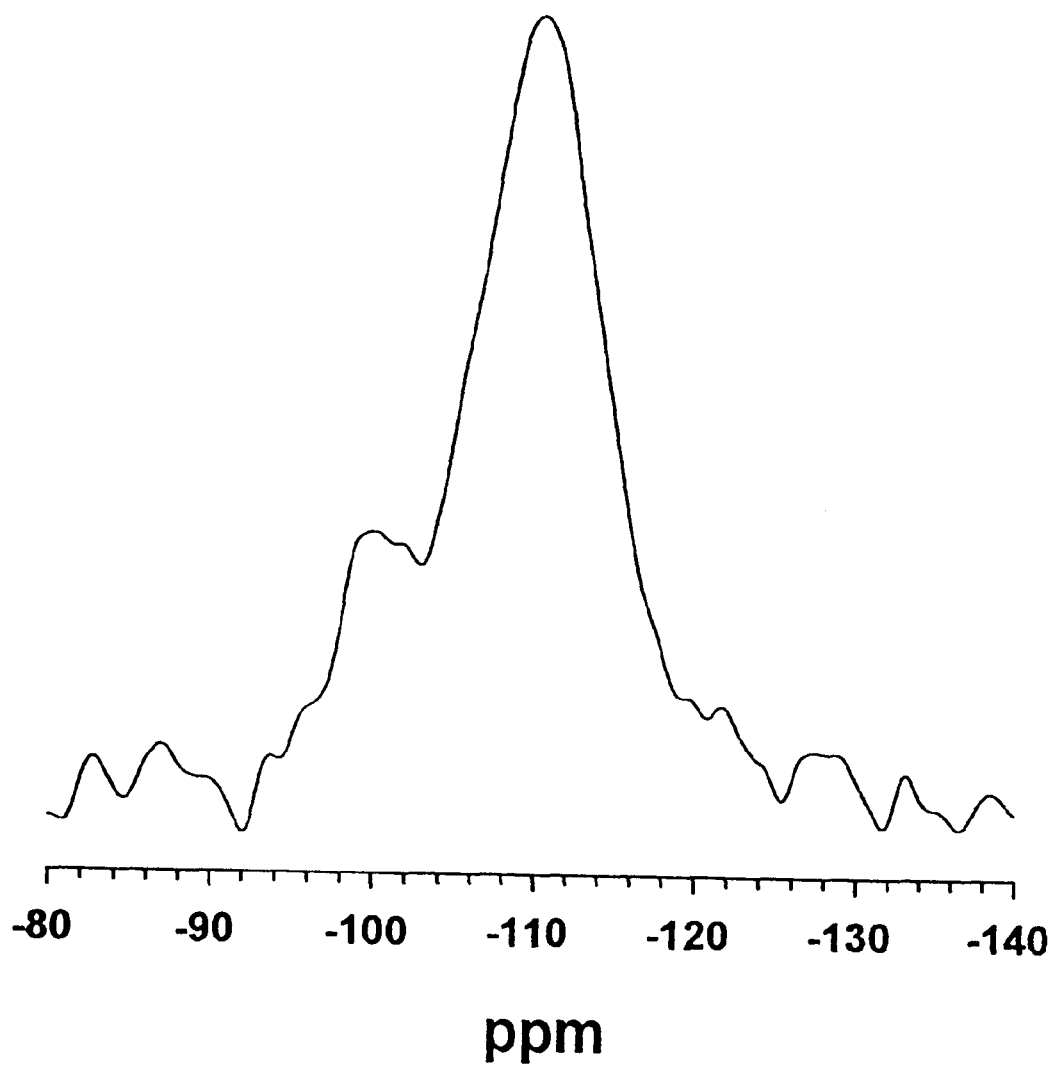
FIG. 5 is a graph showing the $^{29}Si$ MAS-NMR of the as-synthesized product of Example 4.

The results for the product of Example 4 are shown in FIGS. 4 and 5. FIG. 4 shows the $N_2$ adsorption-desorption isotherms and the inset to the figure reports the BJH cell pore size and window pore size distributions derived from these isotherms, respectively. The cell pore size span the range 10–100 nm, while the window size distribution span the range 5–70 nm. Thus the foam contains pores in the mesoporous (2–50 nm) to small macroporous (50–100 nm) size range. FIG. 5 shows the $^{29}$Si MAS NMR spectrum of the product of Example 4. The peak near −112 ppm represents the $Q^4$ siting of $SiO_4$ tetrahedra, whereas the peak near −100 ppm arise from $Q^3$ sites. No $Q^2$ sites were observable in the $^{29}$Si MAS NMR spectrum. The $Q^4/Q^3+Q^2$ ratio was 4.5.

EXAMPLE 7

The following example was prepared to confirm the ability of ethoxylated derivatives of the fatty esters of sorbitan (Tween) to act as a templating agent for mesostructured cellular foam in the manner of the present invention.

A surfactant solution was prepared by adding 1.2 grams of Tween 80 to 10 milliliters of water. 10 milliliters of 1.0 M acetic acid was added to the surfactant solution and stirred for 2 hours. One gram of 1,3,5-trimethylbenzene (TMB) as the organic co-solvent swelling agent was then added at room temperature. The remainder of the synthesis was identical to Examples 2 through 6. The final pH of the silica was 6.6. The reaction stoichiometry expressed in terms of per mole $SiO_2$ corresponded to the following:

| Amount | Reagent |
|---|---|
| 0.073 | Tween 80 |
| 0.67 | TMB |
| 0.77 | NaOH |
| 0.80 | $CH_3CO_2H$ |
| 230 | $H_2O$ |

The resulting solid product was recovered by filtration and calcined at 600° C. for 4 hours in air to remove the incorporated template. The calcined templated product had an average pore size of 22.8 nm, a window size of 12.5 nm, a BET surface area of 422 $m^2g^{-1}$, and a mesopore volume of 1.77 $cm^3g^{-1}$.

EXAMPLE 8

The following example was prepared to confirm the ability of a long-alkyl chain alcohol to act as the organic co-solvent swelling agent for templating a mesostructured to small macrostructured cellular foam in the manner of the present invention.

A surfactant solution was prepared by adding 1.2 grams of PLURONIC P123 to 10 milliliters of water. 10 milliliters of 1.0 M acetic acid was added to the surfactant solution and stirred for 2 hours. One gram of 1-dodecanol as the organic co-solvent swelling agent was then added at room temperature. The remainder of the synthesis was identical to the preparation art described in Example 1. The final pH of the solution was 6.7. The reaction stoichiometry expressed in terms of per mole $SiO_2$ corresponded to the following:

| Amount | Reagent |
|---|---|
| 0.0165 | P123 |
| 0.431 | -Dodecanol |
| 0.77 | NaOH |
| 0.80 | $CH_3CO_2H$ |
| 230 | $H_2O$ |

The resulting solid product was recovered by filtration and calcined at 600° C. for 4 hours in air to remove the incorporated emulsion template. The calcined product had an average pore size of 25.0 nm, a window size of 9.8 nm, a BET surface area of 663.1 $m^2g^{-1}$, and a mesopore volume of 1.71 $cm^3g^{-1}$.

EXAMPLE 9

The example demonstrates the ability of the present invention to prepare compositions whereby another functional inorganic element, for example Al, has been incorporated into the silica foam structure. The molar % of sodium aluminate as aluminum source in the example was 2 mole % of sodium silicate.

Sodium aluminate 0.02 grams was dissolved in the 2.7 grams of sodium silicate (27% $SiO_2$, ~14% NaOH) in 30 milliliters of water (Solution A). Solution A was added to a solution of PLURONIC P123 surfactant and TMB was added in the weight ratio of 0.8 ratio as taught in Example 4. The remainder of the synthesis was identical to the preparation art described in Example 4. The final pH of the solution was 6.4. The reaction stoichiometry expressed in terms of per mole $SiO_2$ corresponded to the following:

| Amount | Reagent |
|---|---|
| 0.02 | sodium aluminate |
| 0.0165 | P123 |
| 0.67 | TMB |
| 0.77 | NaOH |
| 0.80 | $CH_3CO_2H$ |
| 230 | $H_2O$ |

The resulting solid product was recovered by filtration and calcined at 600° C. for 4 hours in air to remove the incorporated template. The calcined templated product had an average pore size of 26.4 nm, a window size of 12.6 nm, a BET surface area of 554.5 $m^2g^{-1}$, and a mesopore volume of 2.14 $cm^3g^{-1}$.

EXAMPLE 10

This comparative example shows the properties of mesoporous silica foams prepared according to the prior art of Schmidt-Winkle et al. as reported in J. Amer. Chem. Soc., 121, 254–255 (1999) and in Chem. Mater., 12, 686–696 (1999).

An aqueous surfactant solution was prepared by adding 2 grams of Pluronic P123 ($EO_{20}PO_{70}EO_{20}$) to 75 milliliters of 1.6 M HCl at room temperature while being stirred. Two grams of 1,3,5-trimethylbenzene (TMB) as the organic co-solvent swelling agent was then added. After 1 hour of stirring at 40° C., 4.4 grams of tetraethylorthosilicate (TEOS) was added. After 20 hours at 40° C., the reaction mixture was aged at 100° C. for 1 day under static conditions. The reaction stoichiometry expressed in terms of per mole $SiO_2$ corresponded to the following:

0.019 P123

0.81 TMB 5.71 HCl

185 $H_2O$

The resulting solid product was recovered by filtration and calcined at 500° C. for 8 hours in air to remove the incorporated template and co-solvent.

This calcined material had a narrow cellular pore size distribution with a maximum at 33.0 nm as determined by nitrogen adsorption, a BET surface area of 800 $m^2g^{-1}$, a mesopore volume of 2.0 $cm^3g^{-1}$, and a $Q^4/Q^2+Q^3$ framework crosslinking value near 2.3 as determined by $^{29}$Si MAS NMR, in agreement with the results reported by Schmidt-Winkle et al.

It is intended that the foregoing description be only illustrative of the present invention and that the present invention be limited only by the hereinafter appended claims.

We claim:

1. A process for the preparation of a mesopoeous to small macroporous cellular silica foam composition with interconnected cells joined at nexus which comprises:
   (a) providing an aqueous mixture of a surfactant and an orgainic co-solvent which swells the surfactant as emulsifying agents;
   (b) providing a solution of a water soluble silicate;
   (c) providing an acid in an amount sufficient to cause precipitation of silica from the silicate solution at a pH between about 5.0 to 9.0;
   (d) combining the reagents in parts (a), (b) and (c) at a temperature greater than −20° C.;
   (e) allowing the reaction mixture of step (d) to age for a minimum time of 5 minutes at one or more temperatures above −20° C.; and
   (f) recovering the precipitated product from the solution; wherein the cellular silica foam composition in uncalcined form derived from a water soluble silicate is selected from the group consisting of sodium silicate, potassium silicate, alkylammonium silicate with interconnected cells joined at nexus defining cellular pores with open windows between the cellular pores and with $SiO_4$, tetrahedral crosslinked to four adjacent silicon sites ($Q^4$), to three adjacent silicon sites ($Q_3$), and to two adjacent silicon sites ($Q_2$), the ratio of $Q^4/(Q^3+Q^2)$ being greater than the ratio when the silica foam is derived from tetraethylorthosilicate and between 2.5 and 8.

2. The process of claim 1 wherein soluble silica solution is a sodium silicate with $SiO_2/OH^-$ ratio of between 0.7 and 2.0.

3. The process of claim 1 wherein the acid is an organic acid.

4. The process of claim 3 wherein the acid is selected from the group consisting of acetic, glycolic, formic and citric acid.

5. The process of claim 1 wherein the non-ionic surfactant and the organic co-solvent swelling agent for the surfactant are removed by solvent extraction, calcination, or both.

6. The process of claim 1 wherein the surfactant is a polymer selected from the group consisting of poly(ethylene oxide), poly(propylene oxide) and block co-polymers thereof.

7. The process of claim 1 with the additional step after step (d) of removing the surfactant and the co-solvent swelling agent and by calcination of the precipitated product at a temperature of at least 300° C. in air for not less than 30 minutes.

* * * * *

UNITED STATES PATENT AND TRADEMARK OFFICE
CERTIFICATE OF CORRECTION

| | | |
|---|---|---|
| PATENT NO. | : 6,641,657 B2 | Page 1 of 1 |
| APPLICATION NO. | : 10/132766 | |
| DATED | : November 4, 2003 | |
| INVENTOR(S) | : Thomas J. Pinnavaia, Thomas R. Pauly and Seong-Su Kim | |

It is certified that error appears in the above-identified patent and that said Letters Patent is hereby corrected as shown below:

In the Specification:

In column 1, line 9, please insert:

-- STATEMENT REGARDING FEDERALLY SPONSORED RESEARCH OR DEVELOPMENT

This invention was made with government support under 9633798 and 9903706 awarded by the National Science Foundation. The government has certain rights in the invention. --

Signed and Sealed this
Seventh Day of October, 2014

Michelle K. Lee
*Deputy Director of the United States Patent and Trademark Office*